United States Patent
Wong et al.

(10) Patent No.: US 6,833,689 B1
(45) Date of Patent: Dec. 21, 2004

(54) METHOD FOR REDUCING THE COST OF VOLTAGE REGULATION CIRCUITRY IN SWITCH MODE POWER SUPPLIES

(75) Inventors: Kent Wong, Fremont, CA (US); Arthur B. Odell, Cupertino, CA (US); Stefan Bäurle, San Jose, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days.

(21) Appl. No.: 10/600,982

(22) Filed: Jun. 20, 2003

(51) Int. Cl.[7] .......................... G05F 1/656; G05F 1/613
(52) U.S. Cl. .................. 323/222; 323/284; 323/285
(58) Field of Search ........................ 323/222, 223, 323/282, 284, 285

(56) References Cited

U.S. PATENT DOCUMENTS

| | | | |
|---|---|---|---|
| 5,689,178 A | * 11/1997 | Otake | 323/282 |
| 6,147,883 A | 11/2000 | Balakrishnan et al. | |
| 6,522,108 B2 | * 2/2003 | Prager et al. | 323/222 |
| 6,650,092 B1 | * 11/2003 | Lidak et al. | 323/207 |
| 6,686,725 B1 | * 2/2004 | Choi et al. | 323/207 |
| 6,710,582 B2 | * 3/2004 | Watanabe | 323/222 |
| 6,754,089 B2 | * 6/2004 | Balakrishnan et al. | 363/16 |

OTHER PUBLICATIONS www.powerint.com, "Design Idea DI–1TopSwitch® Buck Converter," *Power Integrations, Inc.®*, (Jun. 1998).
www.powerint.com, "Design Idea D1–11 TinySwitch–11® Buck Converter," *Power Integrations, Inc.®*, (Aug. 2001).

* cited by examiner

*Primary Examiner*—Bao Q. Vu
(74) *Attorney, Agent, or Firm*—Blakely Sokoloff Taylor & Zafman LLP

(57) ABSTRACT

A reduced cost voltage regulation circuit for switched mode power supplies. In one embodiment, a voltage regulation circuit includes a current sense circuit having a current sense terminal to conduct a current to be sensed by the current sense circuit. A voltage difference between the current sense terminal and a voltage reference terminal is substantially fixed when the current to be sensed by the current sense circuit is substantially equal to a first current sense threshold. The voltage regulation circuit also includes a first impedance coupled between the current sense terminal and the voltage reference terminal to provide a second current sense threshold. The second current sense threshold is equal to a sum of the first current sense threshold and a current to fow through the first impedance. The voltage regulation circuit further includes a second impedance coupled between the current sense terminal and an input terminal. The input terminal has a voltage threshold relative to the voltage reference terminal that is different from a voltage at the current sense terminal by an amount that is a product of the second impedance and the second current threshold.

16 Claims, 9 Drawing Sheets

METHOD FOR REDUCING THE COST OF VOLTAGE REGULATION CIRCUITRY IN SWITCH MODE POWER SUPPLIES

BACKGROUND OF THE INVENTION

1. Field of the Invention

The present invention relates to the field of power supplies, and more specifically to the regulation of power supplies. It involves a method for reducing the cost of regulation circuitry in switch mode power supplies.

2. Background Information

Accurate regulation of power supplies is important in many areas. For instance, in devices employing sensitive electronic circuitry such as computers and televisions maintaining accurate power supply output regulation is important to protect the electronic circuitry being powered from the output of the power supply, often referred to as the power supply load.

Power supply regulation involves keeping either a current or voltage delivered to a load within a specified range. A power supply is deemed to be in regulation if the load current or voltage is within the specified range and is deemed to be out of regulation if the load current or voltage is outside the specified range.

Problems associated with conditions where regulation is lost or there is instability in the power supply operation include damage to the load, improper load functioning, and the consumption of power by the load. It is therefore desirable to regulate a power supply output within specified limits. Due to the cost sensitive nature of many applications employing power supplies, it is also desirable to reduce the cost of the circuitry used to maintain output regulation and stable operation of power supply.

BRIEF DESCRIPTION OF THE DRAWINGS

The present invention detailed illustrated by way of example and not limitation in the accompanying Figures.

DETAILED DESCRIPTION

Embodiments of methods and apparatuses for reducing the cost of regulation circuitry in switch mode power supplies are disclosed. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Figure 1:
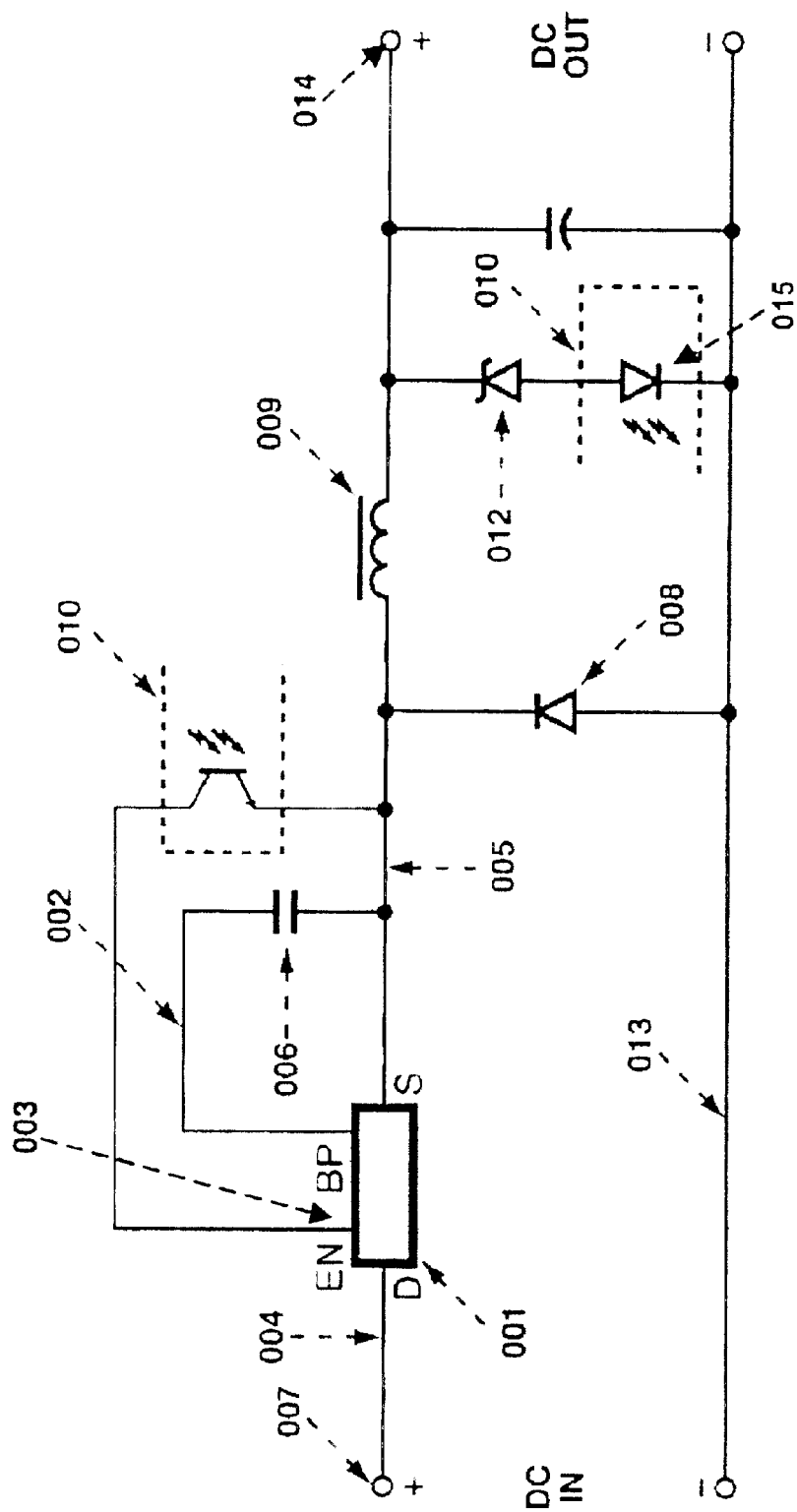
FIG. 1 is a schematic diagram of a buck converter power supply including circuitry to sense power supply output voltage involving the use of a relatively expensive optocoupler.

One commonly used topology of power supply converters is the buck converter, an example of which is shown in FIG. 1. The detailed operation of buck converters will be familiar to one skilled in the art and the following description therefore focuses on aspects relevant to embodiments of the present invention. The voltage regulation of the direct current (DC) output 014 relative to rail 013 of the circuit in FIG. 1, is determined by a voltage regulation circuit comprising zener diode 012, optocoupler 010 and the internal circuitry of integrated circuit 001 coupled to terminal 003. In one configuration, integrated circuit 001 may be for example a TinySwitch power supply regulator of Power Integrations, Inc., of San Jose, Calif., or another suitable equivalent. The voltage regulation circuit of FIG. 1 has a voltage threshold determined by the breakdown voltage of zener diode 012 and the forward voltage of the optocoupler 010 LED 015.

In the configuration illustrated FIG. 1, the internal circuitry of integrated circuit 001 coupled to terminal 003, senses a current flowing through the transistor of optocoupler 010 to control the switching of a semiconductor switch internal to the integrated circuit 001. The control of this internal semiconductor switch in turn controls the delivery of energy from the DC input terminal 007 to the DC output terminal 014 and hence the regulation of the output voltage of terminal 014 relative to rail 013.

A disadvantage of using integrated circuit 001 as illustrated in FIG. 1 is that the internal circuitry coupled to Enable terminal 003 senses current flowing out of the Enable terminal 003, which forces users to use an optocoupler 010 as shown or other circuit configurations that will create current flow out of terminal 003, which increases the overall circuit cost. It is desirable to reduce cost.

Figure 2:
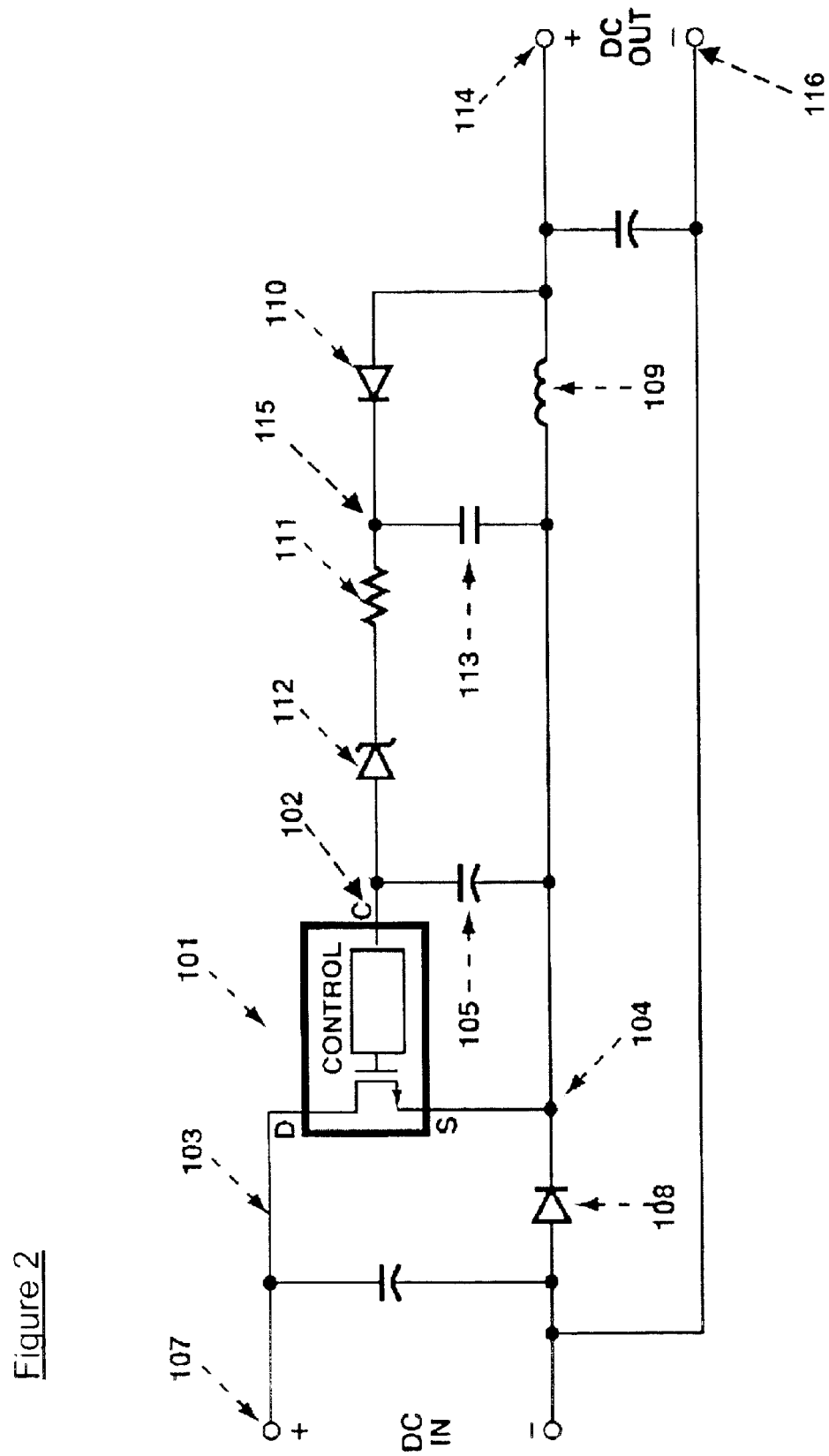
FIG. 2 is a schematic diagram of a buck converter power supply having a relatively high minimum power supply output voltage.

In another configuration, a pulse width modulator (PWM) controller, an integrated circuit 101, is used in a buck converter topology, as shown in FIG. 2. In one configuration, integrated circuit 101 may be for example a TopSwitch power supply regulator of Power Integrations, Inc., of San Jose, Calif., or another suitable equivalent. In this illustration, the voltage regulation of the DC output 114 relative to output terminal 116, is substantially determined by a voltage regulation circuit comprising zener diode 112, resistor 111, capacitor 105 and the internal circuitry of integrated circuit 101 coupled to terminal 102. Integrated circuit 101, includes a power transistor switch which is switched on and off to control the delivery of energy from the power supply input terminal 107 to the power supply output terminal 114.

During normal operation, integrated circuit 101 switches at a fixed frequency. The fixed frequency defines a fixed switching cycle period during which the power transistor is on for an on time period and off for the remaining time of the switching cycle period. The on time period of the power transistor, as a percentage of the overall switching cycle period, is called the duty cycle.

During the on time period of each switching cycle period, the current in inductor 109 ramps up linearly. When integrated circuit 101 turns off at the end of the on time period, catch diode 108 conducts to maintain the instantaneous current in inductor 109 as will be known to one skilled in the art. The source terminal 104 of integrated circuit 101 is therefore clamped by catch diode 108 to a voltage that is the voltage of the output ground terminal 116 minus the forward voltage drop of catch diode 108.

During this period, diode 110 rectifies the voltage across inductor 109. Since the forward voltage drop across diode 110 compensates the forward voltage drop of catch diode 108, the voltage across capacitor 113 is substantially equal to the output voltage 114 relative to output terminal 116. As such, node 115 forms an input terminal to the voltage regulator circuit comprising zener diode 112, resistor 111, capacitor 105 and the internal circuitry of integrated circuit 101 coupled to terminal 102.

The operation of integrated circuit 101 is such that the duty cycle of the internal power transistor is substantially linearly reduced in response to an increase in the current flowing into control terminal 102. As such the integrated circuit 101 receives feedback at control terminal 102 via resistor 111 and zener 112 allowing the internal power transistor duty cycle to be varied to maintain a substantially constant power supply output voltage between terminals 114 and 116. The power supply output voltage regulation threshold is therefore determined by the choice of zener 112 and voltage of terminal 102.

Resistor 111 limits the current into the control terminal 102 within specified levels and typically has little influence on the voltage regulation threshold. Since the duty cycle of the power transistor internal to integrated circuit 101 is varied substantially linearly in response to the current flowing into terminal 102, there is no fixed current threshold associated with terminal 102 but instead an analog variation of duty cycle in response to an analog current flowing into terminal 102.

There are two main disadvantages of using integrated circuit 101 in a buck converter configuration as shown in FIG. 2. The first is that terminal 102 has a voltage of approximately 5.8 volts relative to the source or voltage reference terminal 104 which defines the minimum power supply output voltage of at least 5.8 volts, when using a low cost power supply configuration of the type shown in FIG. 2, which is not low enough in many applications. Any modification of the circuit to allow lower output voltages typically adds significant complexity and cost to the power supply. It is desirable to reduce cost.

A second disadvantage of using integrated circuit 101 as shown in FIG. 2 is that since the integrated circuit 101 operation is substantially fixed frequency, power supply power consumption under light load conditions is typically high since losses associated with switching the internal power transistor are fixed. High power supply consumption under light load conditions is no longer acceptable in many regions of the world where stringent energy saving requirements have been put in place by regulatory bodies.

Figure 3:
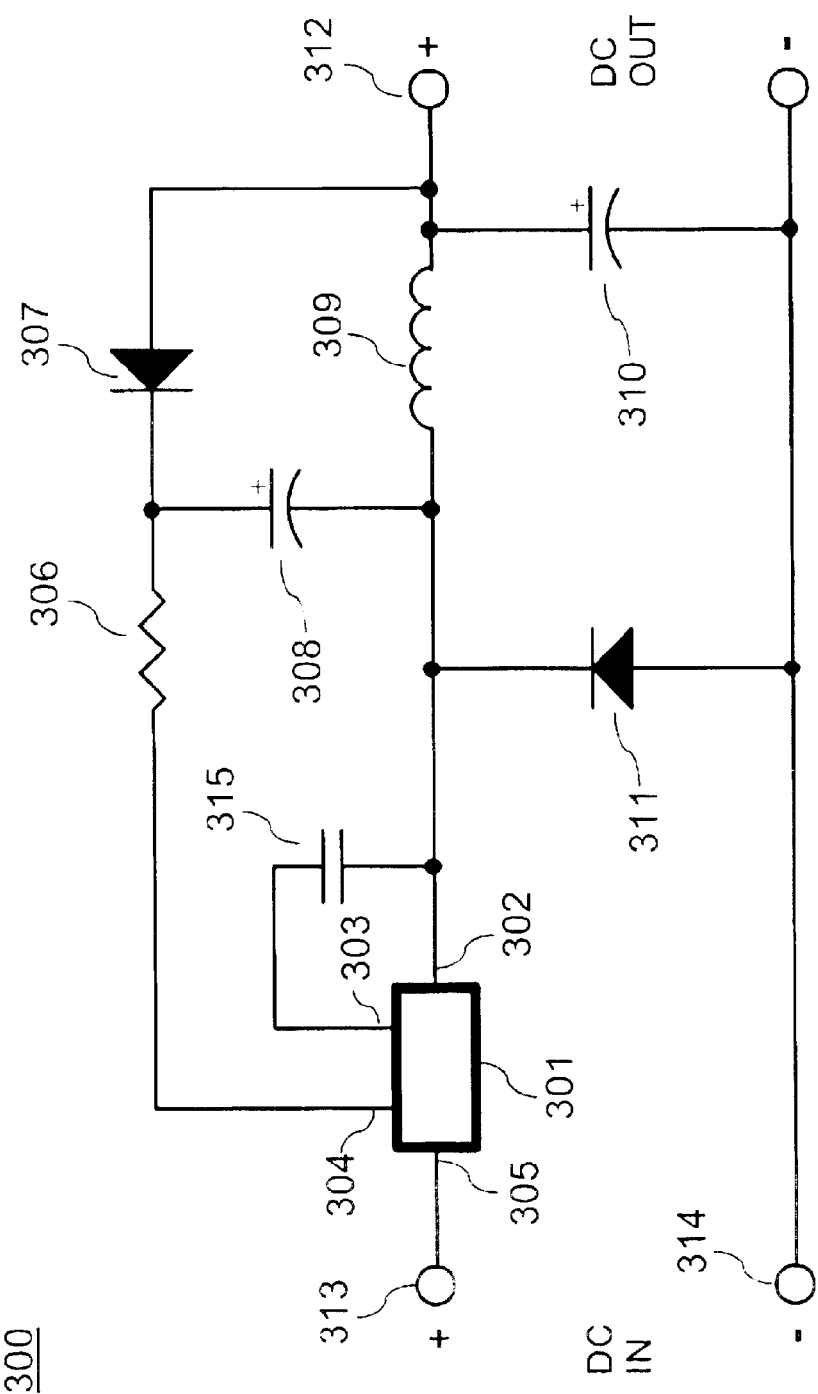
FIG. 3 is a schematic diagram of one embodiment of a low cost non-isolated buck converter power supply including a power supply controller in accordance with the teachings of the present invention.

FIG. 3 is a schematic of one embodiment of a power supply 300 including a power supply controller 301, which overcomes shortcomings of the power supply and power supply controllers discussed above. For instance, in the illustrated embodiment, power supply controller 301 includes a current sense terminal 304 that has reverse logic compared to terminal 003 of FIG. 1, thus allowing simplified feedback circuitry eliminating the need for the optocoupler 010 used in FIG. 1. This will reduce cost. Furthermore power supply controller 301 facilitates power supply designs with low output voltages at terminal 312 relative to terminal 314 since the voltage of terminal 304 relative to terminal 302 is lower than the voltage of terminal 102 relative to terminal 104 in FIG. 2.

The power supply 300 in FIG. 3 is one embodiment of a non-isolated buck converter power supply that utilizes power supply controller 301. In one embodiment, power supply controller 301 includes four terminals: Bypass terminal 303, Enable or current sense terminal 304, Drain terminal 305 and Source or voltage reference terminal 302. The Bypass terminal 303 is coupled to a Bypass capacitor 315, which stores the charge required to power the power supply controller 301. The Drain terminal 305 is coupled to a power supply input voltage terminal 313, while the source terminal 302 is coupled to the catch diode 311, inductor 309 and one terminal of resistor 306.

In one embodiment, since the forward voltage drop across diode 307 compensates the forward voltage drop of catch diode 311, the voltage across capacitor 308 during the period that catch diode 311 is conducting is substantially equal to the output voltage 312 relative to the voltage of terminal 314. Accordingly, in one embodiment, the positive terminal of capacitor 308 may represent an "input terminal," which in one embodiment has a voltage that is representative of or derived from the regulated output voltage of the power supply. The current sense terminal 304 is coupled to current sense circuitry internal to the power supply controller 301, which is described in more detail below with reference to FIG. 4. As will be discussed, the internal current sense circuit has a current threshold. The voltage of terminal 304 relative to voltage reference terminal 302 is substantially fixed when a current equal to the current threshold is conducted in the current sense terminal 304.

In one embodiment, an output from the internal current sense circuitry is used to control the switching of a power transistor internal to power supply controller 301, which controls the transfer of energy from the power supply input terminal 313 to the power supply output terminal 312 and hence regulates the output voltage of the power supply between terminals 312 and 314. In theory therefore the value of resistor 306 can be chosen to determine the voltage across capacitor 308 at which the current threshold above is reached and therefore regulate the output voltage of the power supply.

Figure 4:
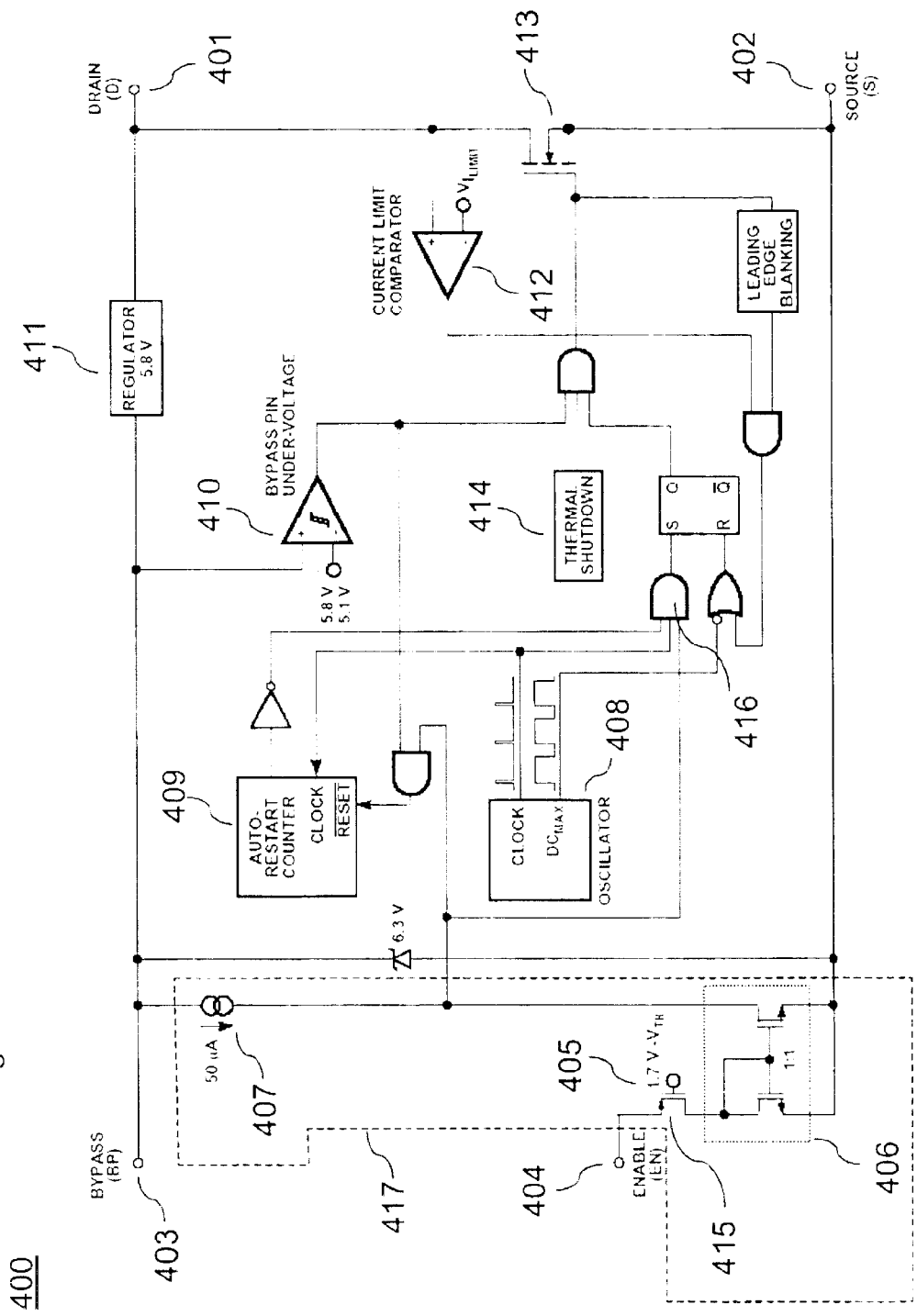
FIG. 4 is a block diagram of one embodiment of a power supply controller in accordance with the teachings of the present invention.

FIG. 4 shows one embodiment of an internal block diagram 400 of power supply controller 301. Enable or current sense terminal 404 is coupled to a current sense circuit 417, which includes a transistor 415 coupled to a current mirror circuit 406, which is coupled to current source 407. In the embodiment shown in FIG. 4, current mirror circuit 406 mirrors the current flowing in transistor 415 substantially in a 1:1 ratio and current sense circuit 417 therefore has a current threshold substantially equal to the value of the current source 407 current. In the embodiment shown in FIG. 4, current source 407 has a current substantially equal to 50 $\mu$A and the current threshold is therefore substantially equal to 50 $\mu$A.

In the embodiment shown in FIG. 4, the current sense circuit 417 has a digital output, which is the signal coupled to the input to logic gate 416 from current source 407. In one embodiment, this digital output is in a first state when the voltage at the input terminal (e.g. positive terminal of capacitor 308) is above a voltage threshold, and the digital output is in a second state when the voltage at the input terminal is below the voltage threshold. In another embodiment, the digital output is in a first state when the voltage at the input terminal is above the voltage threshold by more than an upper hysteresis offset voltage, and the digital output is in a second state when the voltage at the input terminal is below the voltage threshold by more than a lower hysteresis offset voltage.

In one embodiment, the hysteresis offset voltage at the input terminal is determined by a hysteresis in the current threshold of current sense circuit 417. In one embodiment, the hysteresis in the current threshold of current sense circuit 417 is determined by a hysteresis of current source 407 depending on the state of the digital output of circuit 417. The circuitry necessary to provide the hysteresis discussed above, is known to one skilled in the art and is therefore not shown in FIG. 4 so as not to obscure the teachings of the present invention.

In the embodiment shown in FIG. 4, the state of the input to logic gate 416 that is coupled to current source 407, determines, via other logic circuitry which is not described so as not to obscure the teachings of the present invention, whether or not power transistor 413 is turned on when a clock output from oscillator 408 is received at another input to logic gate 416.

In one embodiment, the configuration of the current sense circuitry 417 coupled to the current sense terminal 404 in FIG. 4 is such that the voltage of the current sense terminal 404 relative to voltage reference terminal 402, is substantially fixed when the current conducted at that current sense terminal 404 is substantially equal to the current threshold in accordance with the teachings of the present invention. This is true since the transistor 415 is turned on at a voltage governed by the voltage at its gate 405, which is fixed with respect to voltage reference terminal 402 at 1.7V-$V_{TH}$, where $V_{TH}$ is the turn on threshold voltage of transistor 415, measured between the gate 405 and source 404 of transistor 415. It is appreciated that the teachings of the present invention however are not tied to this specific embodiment illustrated in FIG. 4. Details such as the relative timing of logic signals and the output of the current sense circuitry could vary whilst still benefiting from the teachings of the present invention.

In certain embodiments of circuits using the power supply controller 400, it is an advantage to maintain the current threshold of current sense circuitry 417 as low as possible. One embodiment is described later in FIG. 7 where the current flowing at current sense terminal 404 is drawn from Bypass terminal 403. In one embodiment, Bypass terminal 403 is supplied from an internal regulator circuit 411, which in turn is coupled to be supplied from the Drain terminal 401. In the illustrated embodiment of FIG. 4, since the Drain terminal 401 typically has a relatively high voltage relative to voltage reference terminal 402, to maintain low power consumption, it is beneficial to maintain a low value for the current threshold of current sense circuitry 417. As described above, in the embodiment shown in FIG. 4, the current sense threshold of current sense circuitry 417 is substantially equal to 50 $\mu$A. This value for the current sense threshold of current sense circuitry 417 imposes practical limitations on the operation of the circuit in FIG. 3, since the value of resistor 306 is very high. This high impedance at the current sense terminal 304 introduces noise sensitivity on current sense terminal 304, which may result in unstable operation. However, the design of current sense terminal 404 allows a simple modification to the circuit of FIG. 3, in accordance with the teachings of the present invention, to maintain stable operation whilst leaving power consumption substantially unaltered, as described below.

Figure 5:
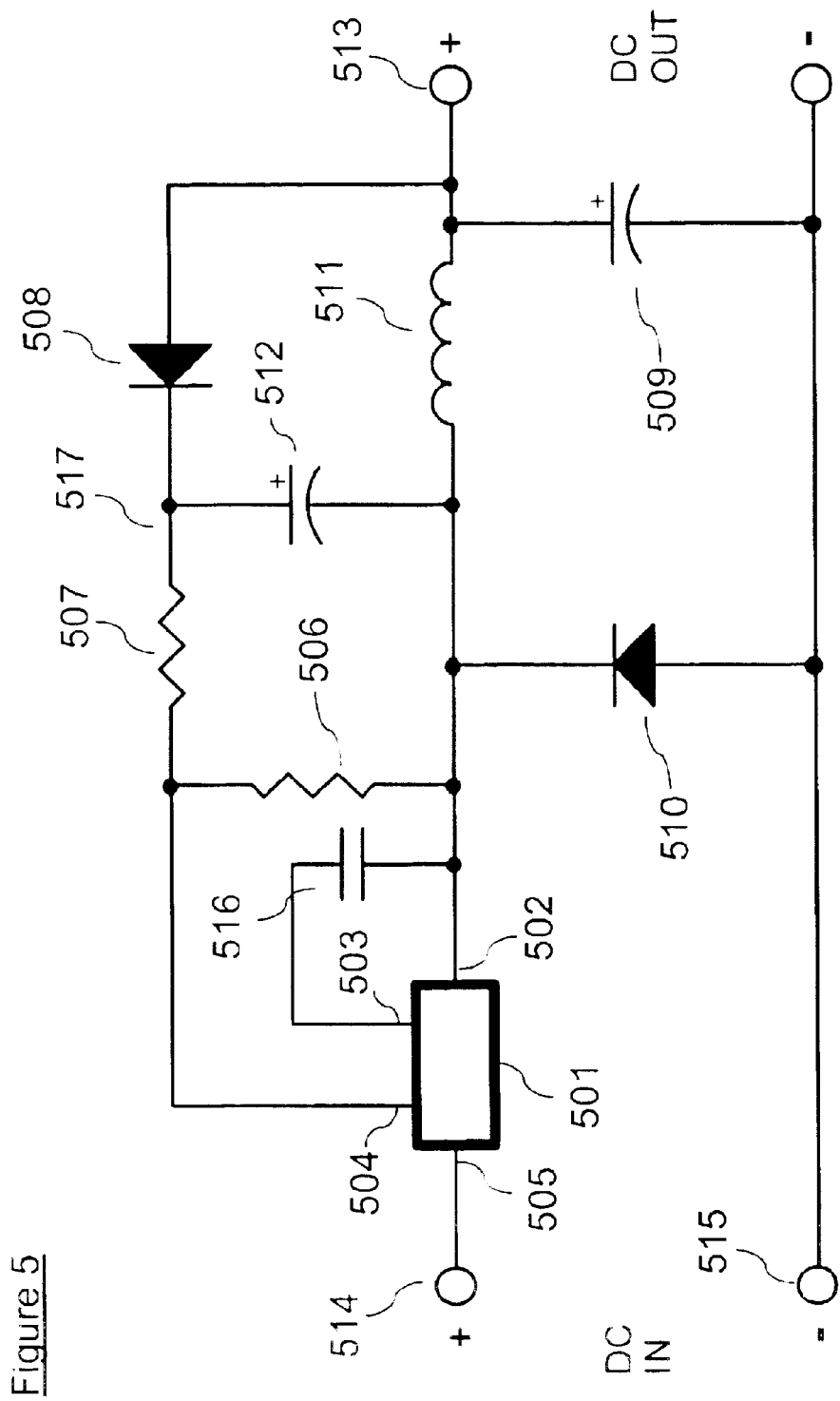
FIG. 5 is a schematic diagram of another embodiment of a non-isolated buck converter power supply including a power supply controller in accordance with the teachings of the present invention.

FIG. 5 shows one embodiment of a DC/DC power supply circuit benefiting from the teachings of the present invention. This power supply circuit, in common with all subsequent power supply circuits described below, can also be an alternating current (AC)/DC power supply with the addition of suitable rectification circuitry at the input to the power supply as will be known to one skilled in the art. As can be observed, the power supply circuit of FIG. 5 is similar to the power supply circuit of FIG. 3 with an the additional resistor 506 coupled between current sense terminal 504 and voltage reference terminal 502. In the illustrated embodiment, the power supply controller 400 described in FIG. 4 may be utilized for power supply controller 501 and the current sense terminal 504 is coupled to an internal current sense circuit having a current threshold.

In the illustrated embodiment, since the voltage of the current sense terminal 504 is substantially fixed relative to the voltage reference terminal 502 when a current substantially equal to the current threshold is flowing in current sense terminal 504, the current flowing in resistor 506 can be accurately determined. Therefore, this current flowing in resistor 506 effectively introduces a second current threshold in accordance with the teachings of the present invention. In one embodiment, this second current threshold is the sum of the current threshold of the internal current sense circuit coupled to current sense terminal 504 and the current flowing in resistor 506.

In one embodiment, since the forward voltage drop across diode 508 compensates the forward voltage drop of catch diode 510, the voltage across capacitor 512 during the period that catch diode 510 is conducting is substantially equal to the output voltage 513 relative to the voltage of terminal 515. Accordingly, in one embodiment, the positive terminal 517 of capacitor 512 may represent an input terminal representative of or derived from the regulated output voltage of the power supply.

In one embodiment, this second current threshold is utilized to determine the choice of resistor value 507 to regulate the voltage across capacitor 512. Since this second current threshold is greater than the current threshold of the internal current sense circuit coupled to current sense terminal 504, the value of 507 is lower than the value of resistor 306 in FIG. 3. With a lower resistor value for resistor 507, noise sensitivity on current sense terminal 504 is therefore reduced, which improves stability in accordance with the teachings of the present invention.

It is appreciated that the power consumption of the power supply of FIG. 5 is only slightly influenced by the addition of resistor 506 since the current flowing in resistor 506 is sourced from capacitor 512, the voltage across which is typically very low as it is derived from the low voltage output voltage of the power supply. Simply increasing the current threshold of the internal current sense circuitry coupled to the current sense terminal 504 of the power supply controller 501 would also allow a reduced value of resistor 507 to be used. However, as explained above with reference to FIG. 4, this can increase power consumption in certain circuit configurations, one of which will be described more fully in FIG. 7, which is undesirable.

Figure 6:
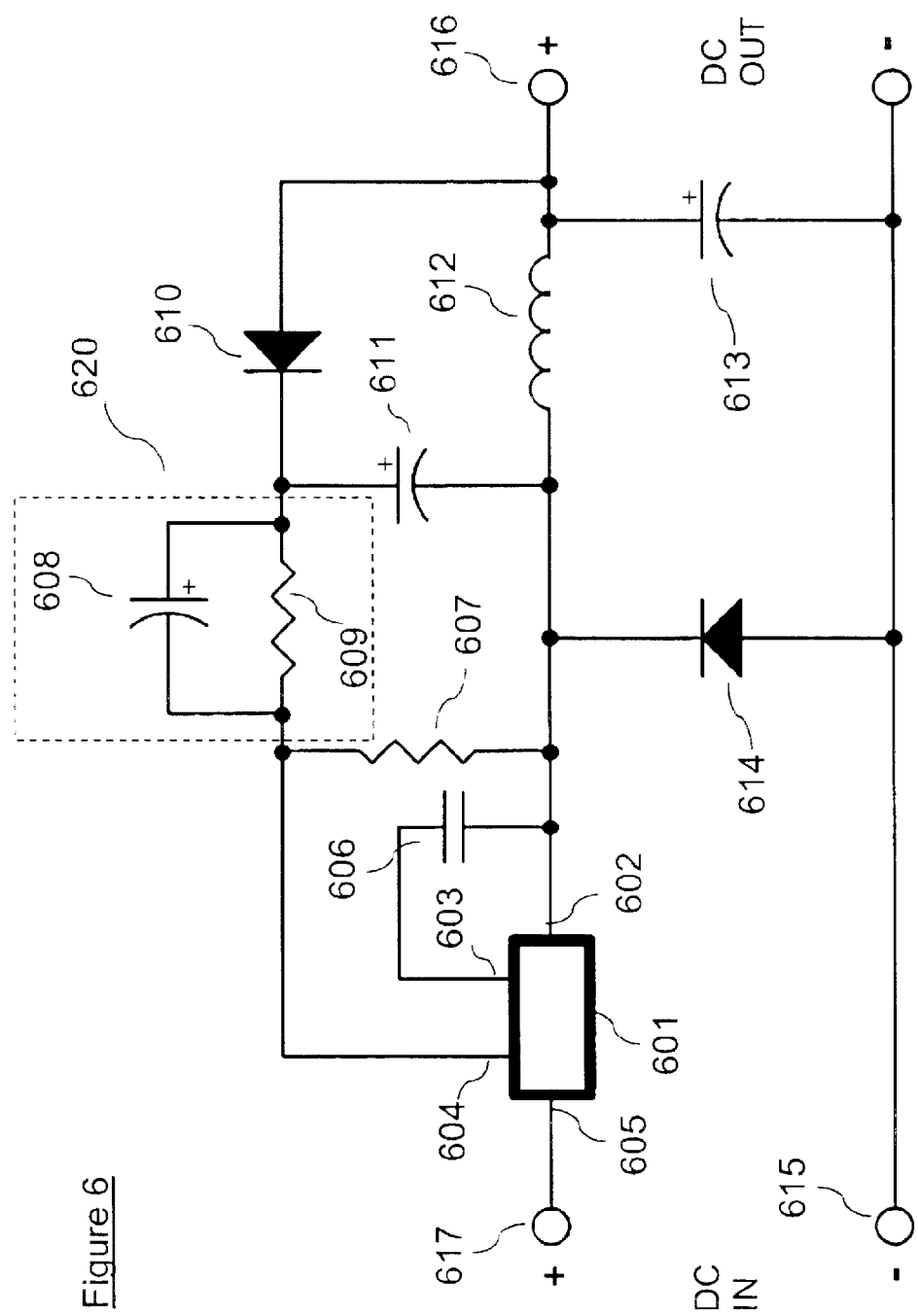
FIG. 6 is a schematic diagram of yet another embodiment of a non-isolated buck converter power supply including a power supply controller in accordance with the teachings of the present invention.

FIG. 6 shows another embodiment of a power supply circuit benefiting from the teachings of the present invention. This circuit is similar to that of FIG. 5 with the addition of a capacitor 608 in parallel to resistor 609. This forms an effective impedance 620, which replaces the simple resistive impedance of resistor 507 in FIG. 5. This embodiment introduces additional AC coupled feedback to current sense terminal 604, from the ripple voltage across capacitor 611, which can further improve circuit stability in some power supply applications. The component symbol used to represent capacitor 608 in FIG. 6, is normally used to represent an electrolytic capacitor as will be known to one skilled in the art. It should be noted however that the benefit of capacitor 608 can be realized using any type of capacitor. The addition of resistor 607 coupled between current sense terminal 604 and voltage reference terminal 602 again provides the advantages described above with reference to FIG. 5 by reducing the impedance at current sense terminal 604 to reduce noise sensitivity at this terminal and therefore improve power supply stability. In one embodiment, the addition of capacitor 608 is not sufficient alone to provide this improvement and therefore still requires the addition of resistor 607 in accordance with the teachings of the present invention.

Figure 7:
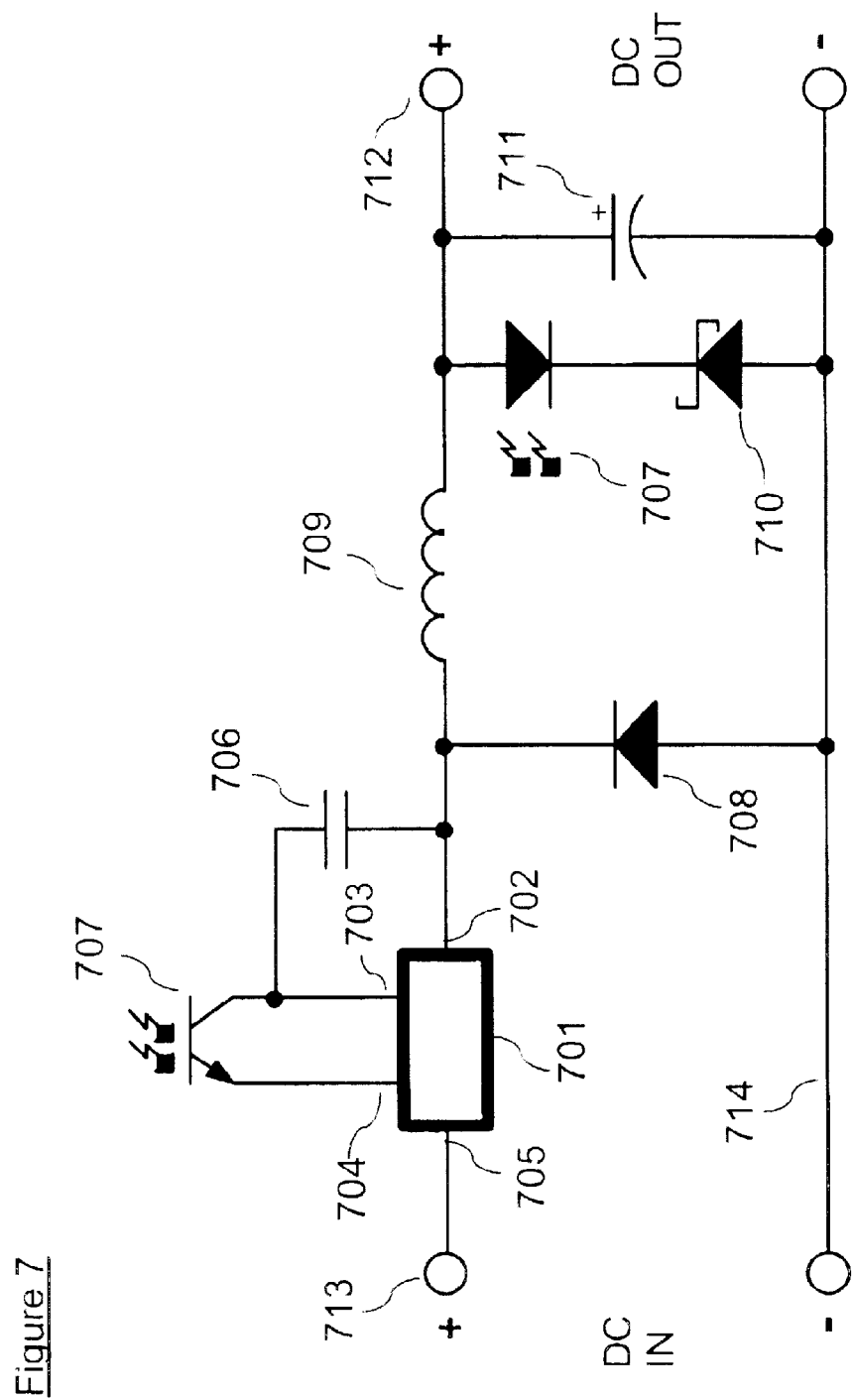
FIG. 7 is a schematic diagram of still another embodiment of a non-isolated buck converter power supply including a power supply controller in accordance with the teachings of the present invention.

FIG. 7 shows another embodiment of a power supply circuit, which demonstrates the value of the teachings of the present invention. In the power supply circuit embodiment of FIG. 7, zener diode 710 and optocoupler 707 are used to provide a very accurate reference, as is required in some applications, for the regulation of the power supply output voltage 712 relative to power supply ground rail 714. The optocoupler transistor is coupled between a Bypass terminal 703 and current sense terminal 704 of the power supply controller 701. In one embodiment, the power supply controller 400 described in FIG. 4 may be utilized for power supply controller 701.

As will be understood to one skilled in the art, the gain of the feedback loop in the embodiment illustrated in FIG. 7 is typically much higher than the circuit shown in FIG. 3 since the impedance of zener diode 710 above its breakdown voltage is much lower than the impedance 306 in FIG. 3. As such the effective impedance at the current sense terminal 704 is lower in this circuit compared to that of current sense terminal 304 in FIG. 3 and the addition of a resistor from current sense terminal 704 to voltage reference terminal 702 is therefore not necessary. Without the benefit of the teachings of the present invention, the current sense threshold of the current sense circuitry, internal to power supply controller 301, coupled to current sense terminal 304 would need to be increased to reduce impedance 306 in FIG. 3. This would then compromise the circuit of FIG. 7, which does not require am increase in the current sense threshold of the current sense circuitry, internal to power supply controller 701, coupled to current sense terminal 704, by increasing the power consumption of the power supply controller 701 and therefore the power consumption of the overall power supply shown in FIG. 7.

Figure 8:
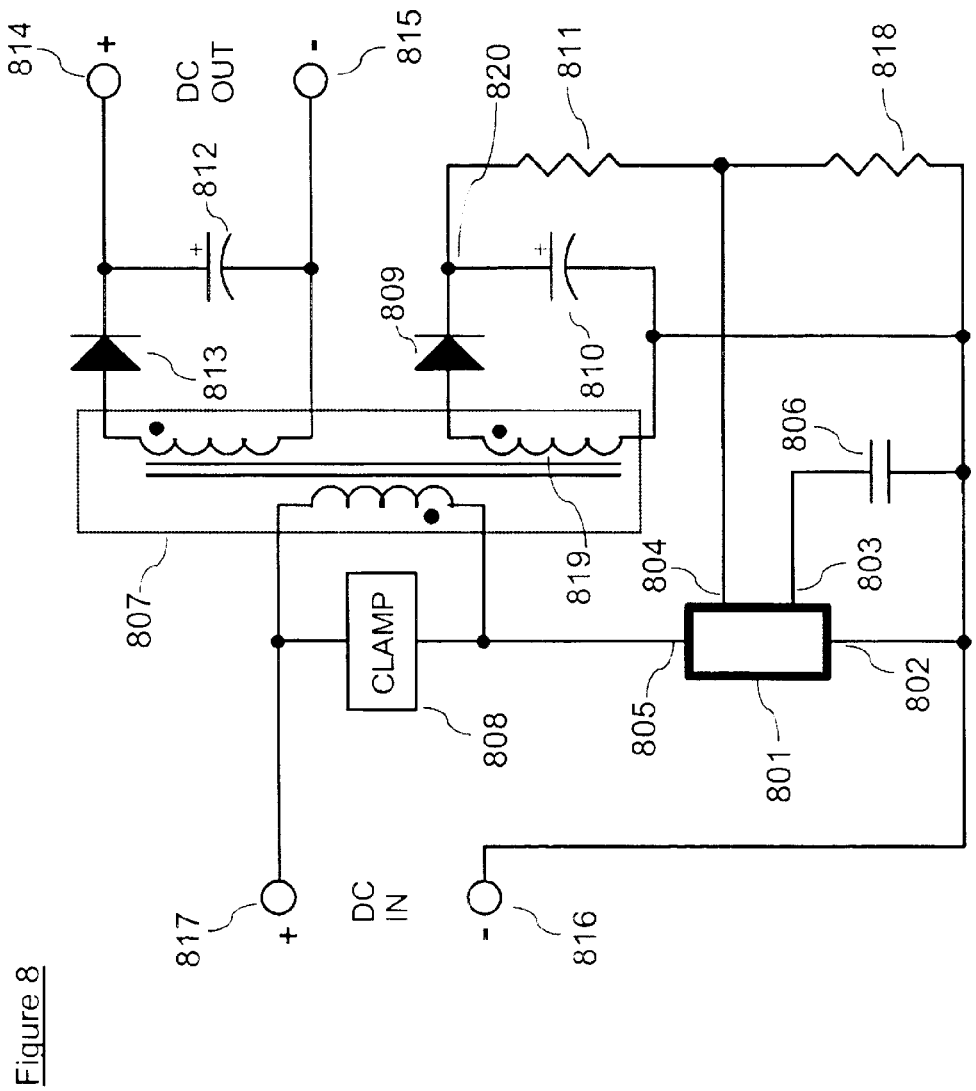
FIG. 8 is a schematic diagram of one embodiment of an isolated flyback converter power supply including a power supply controller in accordance with the teachings of the present invention.

FIG. 8 shows another embodiment of a power supply benefiting from the teachings of the present invention. The power supply of FIG. 8 is an embodiment of an isolated flyback power supply. As will be known to one skilled in the art, the voltage across capacitor 810 is related to the voltage across capacitor 812 through the turns ratio of transformer 807 and is therefore a common solution employed to provide feedback to regulate the output of power supplies of the type shown in FIG. 8.

For the purposes of this description, terminal 820 is the input terminal to a voltage regulator circuit, which includes resistors 811 and 818. In the illustrated embodiment, the voltage at the input terminal 820 is representative of the regulated output voltage of the power supply. As shown in the illustrated embodiment, the power supply further includes voltage reference terminal 802, current sense terminal 804 as well as current sense circuitry, one embodiment of which is shown in FIG. 4 as circuit 417, which is internal to power supply controller 801 and coupled to current sense terminal 804. In one embodiment, the power supply controller 400 described in FIG. 4 may be utilized for power supply controller 801.

In accordance with the teachings of the present invention, resistor 818 is coupled between the current sense terminal 804 and voltage reference terminal 802 to provide a second current threshold equal to the sum of the current flowing through resistor 818 and the current threshold of current sense circuitry internal to power supply controller 801, one embodiment of which is shown in FIG. 4 as circuit 417, coupled to current sense terminal 804. In accordance with the teachings of the present invention, the voltage of the current sense terminal 804 substantially fixed relative to the voltage reference terminal 802 when a current equal to the current threshold of the internal current sense circuit flows in the current sense terminal 804. The resistor 811 is coupled between the input terminal 820 and current sense terminal 804. The input terminal 820 has a voltage threshold relative to the voltage reference terminal 802 that is different from the voltage at the current sense terminal 804 by an amount equal to the product of the value of resistor 811 and the second current threshold.

Figure 9:
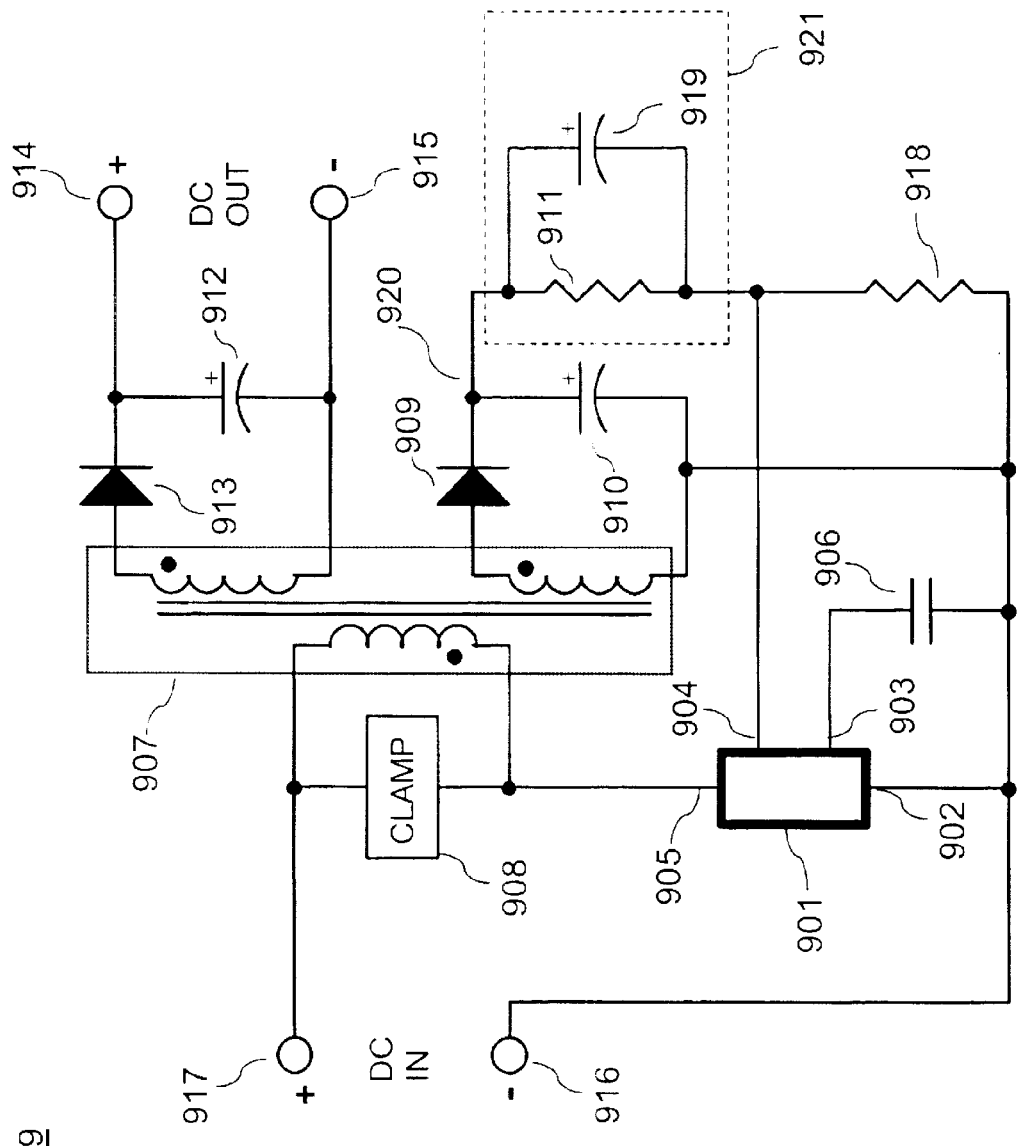
FIG. 9 is a schematic diagram of another embodiment of an isolated flyback converter power supply including a power supply controller in accordance with the teachings of the present invention.

FIG. 9 shows yet another embodiment of a circuit benefiting from the teachings of the present invention. This circuit is similar to that of FIG. 8 with the addition of capacitor 919 in parallel to resistor 911. This parallel combination forms an effective impedance 921. In common with the parallel resistor and capacitor configuration of FIG. 6, this configuration introduces additional AC coupled feedback to current sense terminal 904, which can further improve circuit stability in some power supply applications. The addition of resistor 918 coupled between current sense terminal 904 and voltage reference terminal 902 again provides the advantages described above with reference to FIG. 8 by reducing the impedance at current sense terminal 904 to reduce noise sensitivity at this terminal and therefore improve power supply stability. The addition of capacitor 919 is typically not sufficient alone to provide this improvement and therefore still requires the addition of resistor 918 in accordance with the teachings of the present invention.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A voltage regulation circuit, comprising:

a current sense circuit including a current sense terminal to conduct a current to be sensed by the current sense circuit, wherein a voltage difference between the current sense terminal and a voltage reference terminal is substantially fixed when the current to be sensed by the current sense circuit is substantially equal to a first current sense threshold;

a first impedance coupled between the current sense terminal and the voltage reference terminal to provide a second current sense threshold, wherein the second current sense threshold is equal to a sum of the first current sense threshold and a current to flow through the first impedance; and a second impedance coupled between the current sense terminal and an input terminal of the voltage regulation circuit, wherein the input terminal has a voltage threshold relative to the voltage reference terminal that is different from a voltage at the current sense terminal by an amount that is a product of the second impedance and the second current threshold.

2. The voltage regulation circuit of claim 1 wherein the first impedance comprises a first resistor.

3. The voltage regulation circuit of claim 1 wherein the second impedance comprises a second resistor.

4. The voltage regulation circuit of claim 1 wherein the second impedance comprises a second resistor coupled in parallel with a capacitor.

5. The voltage regulation circuit of claim 1 wherein the current sense circuit includes a digital output, wherein the digital output is in a first state when the voltage at the input terminal is above the voltage threshold, wherein the digital output is in a second state when the voltage at the input terminal is below the voltage threshold.

6. The voltage regulation circuit of claim 1 wherein the current sense circuit includes a digital output, wherein the digital output is in a first state when the voltage at the input terminal is above the voltage threshold by more than an upper hysteresis offset voltage, wherein the digital output is in a second state when the voltage at the input terminal is below the voltage threshold by more than a lower hysteresis offset voltage.

7. The voltage regulation circuit of claim 1 wherein the voltage at the input terminal is representative of a voltage to be regulated by the voltage regulation circuit.

8. The voltage regulation circuit of claim 7 wherein the voltage regulation circuit is included in a power supply circuit.

9. The voltage regulation circuit of claim 8 wherein the voltage to be regulated is derived from at least one output of the power supply circuit.

10. The voltage regulation circuit of claim 8 wherein the power supply is an AC/DC power supply.

11. The voltage regulation circuit of claim 8 wherein the power supply is a DC/DC power supply.

12. The voltage regulation circuit of claim 8 wherein the power supply is an isolated power supply.

13. The voltage regulation circuit of claim 8 wherein the power supply is a non-isolated power supply.

14. The voltage regulation circuit of claim 1 wherein the current sense terminal and the voltage reference terminal are terminals of an integrated circuit.

15. The voltage regulation circuit of claim 14 wherein the integrated circuit further comprises a power transistor.

16. The voltage regulation circuit of claim 14 wherein the integrated circuit is a monolithic integrated circuit.

* * * * *